(12) United States Patent
Ducoulombier

(10) Patent No.: US 7,585,238 B2
(45) Date of Patent: Sep. 8, 2009

(54) ROLLER ASSEMBLY OF A BELT DRIVE SYSTEM

(75) Inventor: André S. N. C. Ducoulombier, Wevelgem (BE)

(73) Assignee: CNH America LLC, New Holland, PA (US)

( * ) Notice: Subject to any disclaimer, the term of this patent is extended or adjusted under 35 U.S.C. 154(b) by 307 days.

(21) Appl. No.: 11/657,989

(22) Filed: Jan. 25, 2007

(65) Prior Publication Data

US 2007/0197326 A1   Aug. 23, 2007

(30) Foreign Application Priority Data

Feb. 6, 2006   (GB) ................................. 0602323.8

(51) Int. Cl.
*F16H 7/22*   (2006.01)
*B65G 39/10*   (2006.01)

(52) U.S. Cl. ...................... 474/123; 198/842; 198/807; 198/617

(58) Field of Classification Search ................ 384/244, 384/247, 519, 583; 474/117, 123, 136; 451/495; 198/369.2, 617, 806, 807, 834, 835, 842
See application file for complete search history.

(56) References Cited

U.S. PATENT DOCUMENTS

| | | | | |
|---|---|---|---|---|
| 85,012 A * | 12/1868 | King | ........................... | 474/136 |
| 134,309 A * | 12/1872 | Pinnell | ....................... | 474/136 |
| 1,650,728 A * | 11/1927 | Strempel | ..................... | 384/583 |
| 2,279,887 A * | 4/1942 | Hathorn | ...................... | 254/398 |
| 2,349,084 A * | 5/1944 | Findley | ........................ | 384/447 |
| 2,421,685 A * | 6/1947 | Crot et al. | ................... | 384/498 |
| 2,736,205 A * | 2/1956 | Dunne, Jr. | .................. | 198/842 |
| 2,795,148 A * | 6/1957 | Zuercher | .................... | 474/108 |
| 3,125,897 A * | 3/1964 | Zeman | ........................ | 74/531 |
| 3,225,902 A * | 12/1965 | Roinestad | ................... | 198/617 |
| 3,239,285 A * | 3/1966 | Madeira et al. | ............. | 384/583 |
| 3,406,438 A * | 10/1968 | Reilly | ........................ | 198/843 |
| 4,023,426 A | 5/1977 | Duryea, Jr. | | |
| 4,118,897 A * | 10/1978 | Martin | ....................... | 451/355 |
| 4,173,904 A * | 11/1979 | Repetto | ...................... | 474/104 |
| 4,344,218 A * | 8/1982 | Hooper et al. | ............... | 29/516 |
| 4,425,103 A * | 1/1984 | Foster | ........................ | 474/138 |
| 4,509,935 A * | 4/1985 | Foster et al. | ................ | 474/138 |
| 4,816,012 A * | 3/1989 | Bytzek | ....................... | 474/135 |
| 4,957,471 A * | 9/1990 | St. John | ..................... | 474/133 |
| 5,045,029 A * | 9/1991 | Dec et al. | ................... | 474/112 |
| 5,073,148 A * | 12/1991 | Dec | ............................ | 474/94 |
| 5,518,457 A * | 5/1996 | Seki et al. | ................... | 474/102 |
| 5,820,503 A * | 10/1998 | Bruchner et al. | ............ | 474/112 |
| 2005/0026731 A1 * | 2/2005 | Skidmore et al. | ........... | 474/116 |

* cited by examiner

*Primary Examiner*—Bradley T King
*Assistant Examiner*—Stephen Bowes
(74) *Attorney, Agent, or Firm*—Michael G. Harms; John William Stader; Patrick M. Sheldrake

(57) ABSTRACT

A roller assembly for a belt drive system of an agricultural machine, the roller assembly having a shaft, a roller rotatably mounted on the shaft, and adjustment means for adjusting the position of the shaft.

The adjustment means includes means for angular adjustment of the position of the shaft in two distinct directions.

13 Claims, 4 Drawing Sheets

ROLLER ASSEMBLY OF A BELT DRIVE SYSTEM

TECHNICAL FIELD

This invention relates to a drive system for a belt in a drive line of an agricultural machine such as a forage harvester, and more particular to the roller assemblies of the belt drive system.

BACKGROUND ART

Forage harvesters are machines which chop crop gathered from a field into small pieces to produce animal feed. In the case of crops such as grass or alfalfa, these may have been mown and left to dry in the sun, so that the crop need only be gathered by the harvester. With other crops, such as maize, the forage harvester is also required to cut the crop. Thus, the harvesters may be fitted with different headers to suit the crop being harvested.

The crop, whether cut maize or gathered grass, is fed to a rotating knife drum or cutter which comminutes the product. With grass crops, this alone is sufficient to produce the desired forage. However, when harvesting maize for silage purposes, the cutting alone does not suffice due to the presence of kernels in the crop. The kernels need to be cracked in order to release the nutrient, as uncracked kernels are hard for animals to digest. As cutting alone is insufficient to crack all the kernels, the crop is additionally passed through a crop processor which comprises two closely adjacent rollers, typically having serrated surfaces, which rotate such that there is a speed differential between the adjacent surfaces. The gap between the rollers is set to suit the size of grain passing through and the speed, rotational energy of the rollers, relative movement and serration of the surfaces together ensure cracking of any kernels that are still intact after chopping by the cutter.

The momentum of the maize from the crop processor or the grass from the cutter, as the case may be, carries the crop into a blower which then propels it up a tower to a discharge spout through which it is discharged into a wagon or a trailer drawn by a separate vehicle driven alongside the harvester.

When chopping kernel-free crops, such as grass or alfalfa, the crop processor is not required and leaving it in place in the crop flow path results in its rollers being unnecessarily subjected to wear. To avoid such wear, it has previously been proposed in GB 2 414 373 to pivot the crop processor away from its operative position in the crop path but to leave it on the vehicle in an inoperative position. In order to optimize crop flow, the blower and the crop processor are connected to a common pivot frame so that as the crop processor is withdrawn from the crop flow path, the blower moves downwards to take its place.

Because the drive pulley of the blower needs to move between two different positions, a movable tensioning roller is required for the belt that transmits drive from the engine to the blower. Such a belt, which travels endlessly around a drive pulley and at least one driven pulley, is often very long since the centre distances between the driving and driven pulleys are relatively great. When the machine travels over uneven surfaces, the drive and driven shafts may twist relatively to one another because of frame deformation and cause lateral forces on the belt. These lateral forces may result in the displacement of the belt on the pulleys and even a complete run-off of the belt from the system. Furthermore, if a quick turn is needed, the driver will push the left or right brake and the back of the machine will spin around its front wheels. The large and heavy belt is not always able to follow the quick movement of the back of the machine due to the inertia of the belt. The belt will thus arrive at the tensioning roller under an angle and may run-off.

U.S. Pat. No. 5,242,331 B describes a belt drive system which prevents lateral slippage of the belt in the event that the drive and driven shafts twist relative to one another. This system comprises a tensioning unit having a profiled idler pulley, followed in the belt travel direction by a back chucking roller. The pulley and the roller are mounted at a small distance from each other into a U-shaped retainer to form the tensioning unit. The shaft of the roller is pivotably connected to an arm, which in turn is pivotably connected to the shaft of the driven pulley. Consequently, the distance between the roller and driven pulley is defined. The belt is held between the roller and the idler pulley, such that its sections cannot leave the grooves of the idler pulley.

A disadvantage of this system is that the complete tensioning system, including the adjacent wheel needs to be disassembled before the belt can be removed or replaced. After installation of the new belt, the clamping unit and the retainer need to be re-adjusted so that the belt is correctly aligned and will not run-off. Disassembling and reinstalling the front wheel and the tensioning system and re-adjusting the clamping unit and retainer are critical and time consuming tasks.

In addition thereto, the belt of the drive described in U.S. Pat. No. 5,242,331 has a reduced lifetime since it is subject to excessive wear. The tensioning roller and the idler pulley are retained at a fixed distance from one another in the retainer. A compression spring cylinder is rigidly joined to the retainer to keep the belt under a constant load. However, due to vibrations, the belt will also tend to vibrate and the compression spring cylinder will react to keep a constant pressure on the belt. Because the compression spring cylinder acts directly on the upper portion of the retainer adjacent the back chucking roller, the latter will be pushed more to the front more rigorously than to the idler pulley. This will result in a pinching action of the back chucking roller and idler pulley on the belt. These extra forces push the profiles of the idler pulley deeper into the belt and damage the belt which will result in a reduced lifetime.

Finally, another disadvantage of the system as described in the aforementioned US patent is that the lubrication of the bearings of the back chucking roller and the idler pulley is only possible when the machine is not working. When servicing to the machine, grease is also pumped manually through the lubrication fittings into the interior of the back chucking roller and the idler pulley. This again is a time consuming task and inadequate lubrication of the back chucking roller and the idler pulley will decrease the lifetime of the roller and pulley.

DISCLOSURE OF THE INVENTION

Technical Problem

It therefore is the object of the present invention to provide an improved roller assembly for a belt in a drive line of an agricultural machine which is easy to position to allow alignment of all rotary elements of the belt drive system to prevent run-off of the belt without having to improve the accuracy of the components of the roller assemblies or the chassis and which assembly additionally remedies to the above defined problems of the prior art.

Technical Solution

According to the present invention, there is provided a roller assembly for a belt drive system of an agricultural machine as claimed in claim 1.

Advantageous Effects

Such a roller assembly is easy to install and to position relatively to the other elements of the drive line system, without the need to make changes to other elements of the drive line system and to manufacture the components of the roller assembly or the chassis of the agricultural machine with a high precision. It is thus possible to correct misalignment of the surfaces of the rollers by adjusting the roller assembly without increasing the production cost of the roller assembly and the other elements of the drive line system or chassis of the agricultural machine.

Another advantage of the roller assembly is that after initial installation, no re-adjustment or re-positioning of the roller assembly is needed when the belt is removed and replaced. Removal of the belt will not alter the position of the roller assembly, since no components of the roller assembly need to be loosened or removed prior to removing the belt. Removal of the belt is enabled by removing the load exercised by the tensioning roller to the belt and thus by releasing the tensioning system, which will not influence the relative position of the surface of the roller assembly to the other elements of the drive line system of the agricultural machine.

A further advantage is that, due to the configuration of the roller assembly, it is possible to reserve sufficient space between all the components of the belt drive system. This will prevent pinching of the belt between two components, and thus increased wear of the belt, when the axes of drive pulley and driven pulley are twisted relatively to one another.

Additionally, the roller assembly may be connected to an automatic lubricant circuit that will adequately lubricate the bearings of the roller on regular intervals. This has the advantage of an increased lifetime of the roller, since lubrication is no longer dependent of the service intervals done by the driver of the machine. The connection to such automatic lubricant circuit is possible since no disassembly of the roller assemblies is needed when removing the belt and because the greasing nipples are, when the machine is used, on a fixed position relative to the chassis.

BRIEF DESCRIPTION OF THE DRAWINGS

The invention will now be described in further detail, by way of example only, with reference to the accompanying drawings, in which.

DETAILED DESCRIPTION OF THE PREFERRED EMBODIMENT

Figure 1:
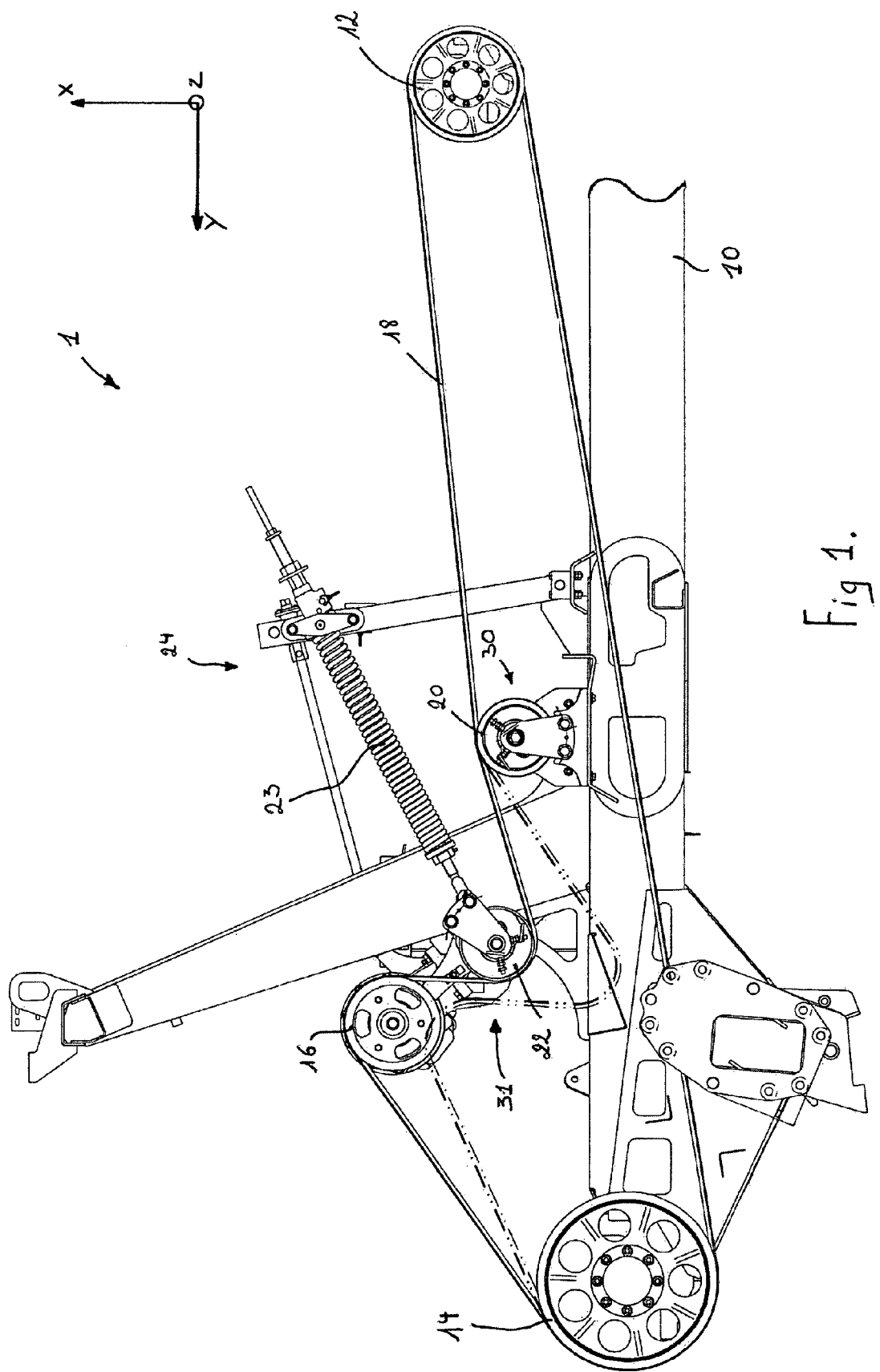
FIG. 1 is a schematic representation of a belt drive of the blower and cutter of a forage harvester, comprising an idler roller assembly and a tensioning roller assembly according to the invention.

FIG. 1 shows part of the chassis 10 of a forage harvester on which there is mounted an engine driving a pulley 12, a cutter driven by a pulley 14 and a blower driven by a pulley 16 and the belt drive system 1 drivingly connecting the pulleys 12, 14, 16. The engine, cutter and blower are not shown in the drawing but reference may be made to GB 2 414 373 for a more detailed description of the harvester.

The belt drive system 1 comprises a belt 18 which also passes over an idler roller 20 of an idler roller assembly 30 and a tensioning roller 22 of a tensioning roller assembly 31. Because the blower pulley 16 can take two different positions (for the reasons explained previously), a tensioning system 24 is required that is capable of maintaining the belt 18 correctly tensioned in both positions of the pulley 16, as well as in any position in between of the pulley 16 and the blower.

In most cases, the upper surface of the beam of the chassis 10 of the forage harvester is not perfectly flat. In addition thereto, the positioning of the holes used for securing the roller assemblies 30, 31 to the chassis 10 may also vary so that, when the idler roller assembly 30 and tensioning roller assembly 31 are installed on the chassis 10, a misalignment relative to the other elements of the belt drive system 1 may occur.

For clarity reasons, a XYZ reference is added to all figures. The Z direction is chosen to coincide with the axis of the idler roller 20. The X direction is chosen parallel with the sides 32, 34 of the idler roller 20 and extends from the roller axis towards the belt 18.

In order to prevent the belt 18 from running-off the belt drive system 1, it is necessary for the surfaces of all pulleys 12, 14, 16 and rollers 20, 22 to be perfectly aligned with each other. When mounting the idler roller 20 and tensioning roller 22 in the roller assemblies 30, 31, a misalignment may occur along the X, Y and Z direction. A misalignment along the X direction occurs, when one side 32 of the roller 20, 22 is positioned higher then the other side 34 of the roller 20, 22. In this case, the belt 18 will tend to move towards the lowest side 34 of the roller 20, 22 and will eventually run-off.

A misalignment along the Y direction occurs when one side 32 of the roller 20, 22 is moved to the front relative to the other side 34 of the roller 20, 22. The belt 18 will be pulled to the foremost side of the roller 20, 22 and will also run-off.

In addition, the engine pulley 12, cutter pulley 14, blower pulley 16 and idler roller 20 are all provided with grooves 26 which correspond to sections of the belt 18 for guiding the belt and transferring power between the belt 18 and the pulleys 12, 14 and 16. It is equally important to have a correct alignment of the grooves 26 of all the pulleys 12, 14, 16 and idler roller 20 relatively to each other in a transverse direction. This third misalignment of the idler roller assembly 30 will have the effect that the belt 18 is not fully loaded on one side of the grooves 26 of the idler roller 20. This will cause the grooves of the belt to jump over to the adjacent grooves 26 of the idler roller 20 which results in the belt 18 to run-off the belt drive system 1.

Of course, a combination of two or even three misalignments along the X, Y or Z direction is also possible and will increase the likeliness of the belt 18 of running off the belt drive system 1.

The misalignments of the surfaces of the idler roller 20 and the tensioning roller 22 in the X and Y directions and the misalignment of the grooves of the idler roller 20 in the Z direction can be corrected by the structure of the roller assemblies 30, 31 of the invention.

Since the tensioning roller 22 has a smooth surface, a misalignment along the Z direction will not cause the belt 18 to run-off, if the width of the surface of the tensioning roller 22 is sufficient to overcome the misalignment. However, if grooves 26 would be provided on the tensioning roller 22, the possible misalignment along the Z direction will also need similar compensation.

Figure 4:
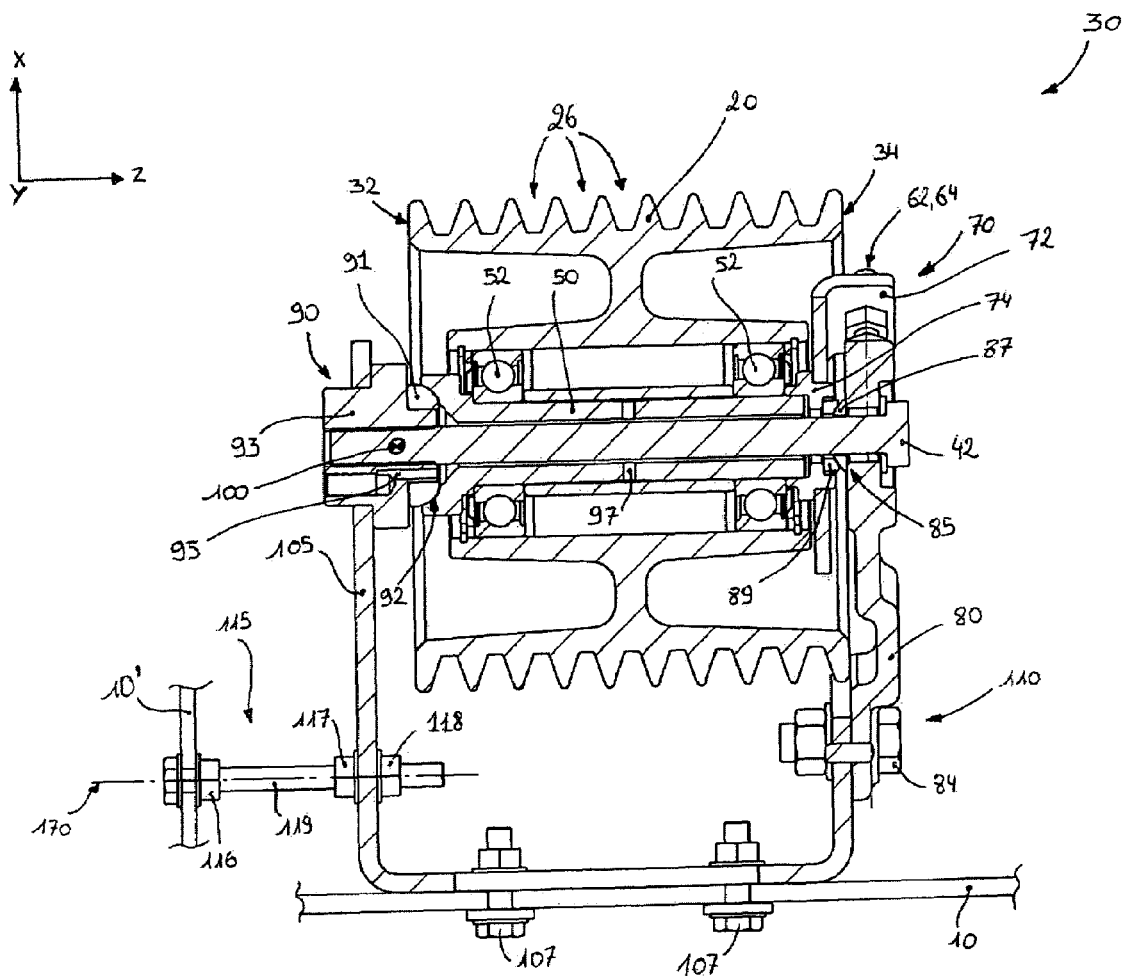
FIG. 4 is a vertical cross section of the idler roller assembly of FIG. 2, taken through the axis of the roller.

The idler roller assembly 30 according to the invention is shown in greater detail in FIG. 4. The idler roller 20 is mounted on a shaft 50 by means of bearings 52 for allowing free rotation of the roller 20 around the shaft 50. On one side 34 of the roller 20, adjustment means comprising positioning means 70 are connected to the shaft 50 for angular adjustment of the axis of the shaft 50 around a virtual pivot point 100 in two distinct directions 150,160. The positioning means 70 comprise a bracket 72 and a sleeve 74. The sleeve 74 is press-fitted on the shaft 50 to securely connect the bracket 72 to the shaft 50. Although in the preferred embodiment the sleeve 74 is welded to the bracket 72, the two parts can also be made as a one piece casting.

Figure 2:
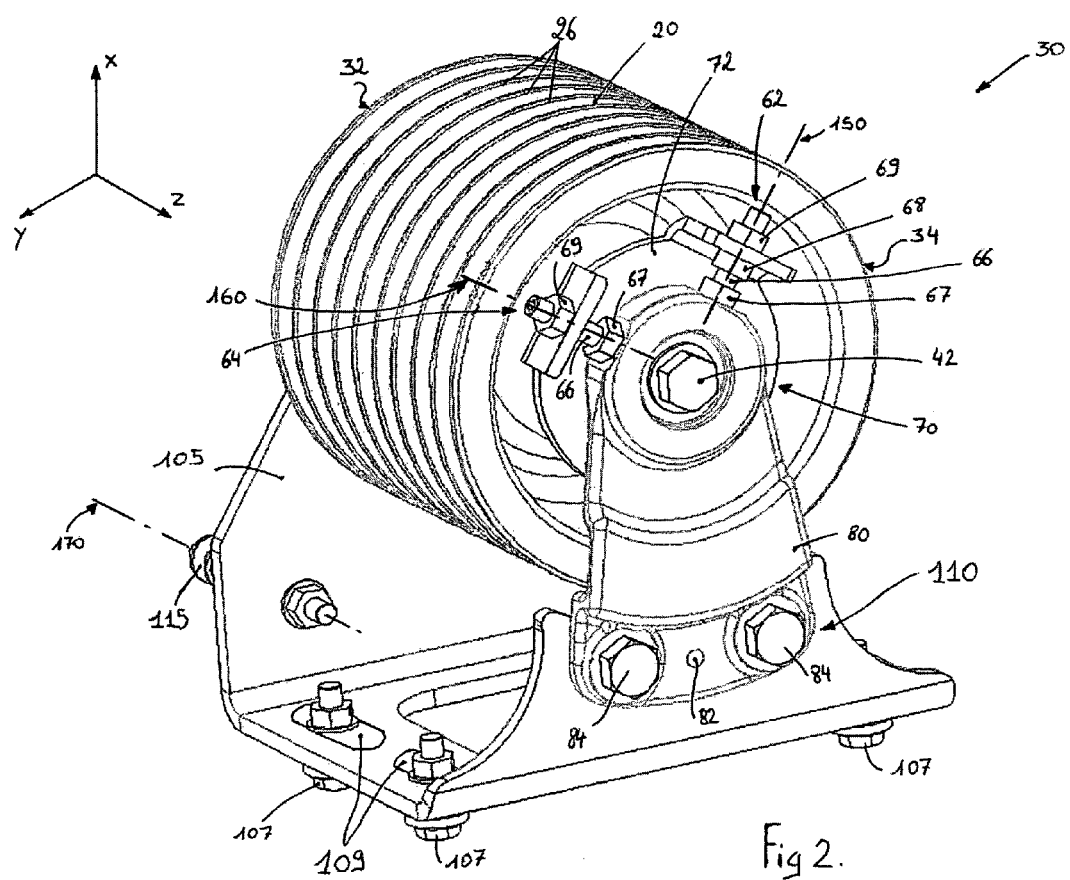
FIG. 2 shows a perspective view of the idler roller assembly of FIG. 1.
Figure 3:
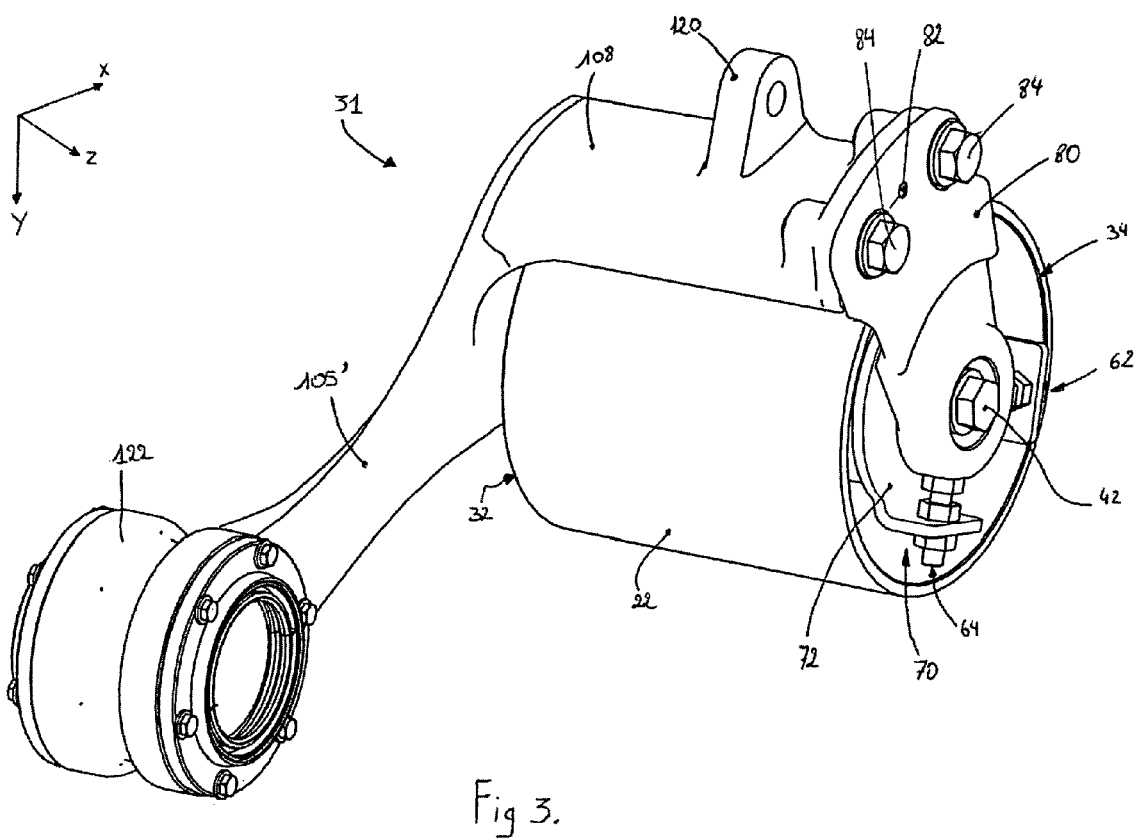
FIG. 3 shows a perspective view of the tensioning roller assembly of FIG. 1.

The positioning means 70 comprise two positioning screw connections 62, 64, each positioning screw connection 62, 64 preferably having a threaded rod 66 and three nuts 67, 68, 69 (FIG. 2). The threaded rod 66 is screwed into a threaded hole in a support 80. To prevent movement of the treaded rod 66 relative to the support 80, a first nut 67 is turned completely against a flattened surface of the support 80 using a predetermined torque to secure the rod 66. Alternatively, the nut 67 may also be welded onto the flattened side of the support 80. A thread locker may be used to rigidly secure the nut 67 and thus the threaded rod 66 to the support 80. A second nut 68 is screwed onto the treaded rod 66 between the first nut 67 and an ear of the bracket 72, while a third nut 69 is also screwed onto the treaded rod 66, but on the other side of the ear of the bracket 72.

The roller assembly 30 further comprises clamping means 85 allowing to clamp the shaft 50 in a fixed position relative to the support 80 after adjustment. The clamping means 85 comprises a spherical washer 87 and a seat element 89. The convex surface of the spherical washer 87 is seated against the concave surface of the seat element 89. The spherical washer 87 and the seat element 89 are installed between the sleeve 74 of the positioning means 70 and the support 80 and move relative to each other when the position of the shaft 50 is changed by the positioning means 70 for angular adjustment of the shaft 50.

The roller assembly 30 also comprises a convex seat arrangement 90 comprising a base 93 with a threaded hole, a convex seat 91 press-fitted onto the base 93 and a concave seat surface 92 on the end of shaft 50, the surface being seated against the seat 91. When the position of the shaft 50 is adjusted by the positioning means 70, the concave seat surface 92 of the shaft 50 and the convex seat 91 will move relative to each other to allow angular adjustment of the shaft 50 around the virtual pivot point 100 without axial displacement of the shaft 50.

The sleeve 93 of the convex seat arrangement 90 is connected to a further support 105, which in turn is connected to the chassis 10.

The support 80 is provided with connection means 110 for connecting the support 80 to the further support 105. The connection means 110 comprise two screw connections 84 inserted through holes in the support 80 and the further support 105 and a set pin 82 to determine the position of the support 80 relative to the further support 105. This support 105 is connected to the chassis 10 of the forage harvester by means of four screw connections 107 extending through four slots 109 in the support 105. It however is obvious that the support 80 and the further support 105 could be connected directly to the chassis 10 without being first connected to each other.

Further positioning means 115 are provided to the further support 105 for translational adjustment of the idler roller assembly 30 in a direction 170 substantially parallel to the shaft 50. The further positioning means 115 comprise a screw 119 positioned through a hole in the chassis member 10' and a hole in the further support 105. The positioning means 115 further comprise a first nut 116 screwed onto the threaded screw 119 and set against the chassis member 10' to secure the further positioning means 115 to the chassis 10'. It further comprises a second nut 117 screwed onto the threaded screw 119 and located between the first nut and the further support 105, and finally a third nut 118 screwed onto the threaded screw 119 on the other side of the further support 105 for forcing the support against the second nut 117.

A bolt 42 forming part of the clamping means 85 preferably extends through the support 80, the spherical washer 87, the seat element 89, the sleeve 74 of positioning means 70 and the shaft 50 so that the threaded end of the bolt 42 is screwed into a threaded hole in the base 93 of the convex seat arrangement 90 to secure all elements of the idler roller assembly 30 after adjustment. Alternatively, it is also possible to replace the bolt 42 with two bolts, a first bolt extending through the support 80, the spherical washer 87, the seat element 89, the positioning means 70 and one half of the shaft 50, while a second bolt extends through the sleeve 93 of the convex seat arrangement into a second half of the shaft 50.

The sleeve 93 of the convex seat arrangement further is provided with a cavity 95 registering with a further cavity 97 in the shaft 50 for supplying lubricant to the bearings 52 of the roller 20. The cavity 95 may be connected to an automatic lubrication system of the forage harvester to allow lubrication of the idler roller assembly 30 on regular intervals without intervention of the driver of the forage harvester.

When the surface of the idler roller 20 is misaligned relative to the surfaces of the other elements of the belt drive system 1, the misalignment can be corrected by loosening clamping blot 42 and adjusting at least one positioning screw connection 62 or 64. Repositioning of the shaft 50 is accomplished by moving bracket 72 of the positioning means 70 along an axis 150 and/or 160 of the positioning screw connections 62, 64.

The bracket 72 can be repositioned along the axis 150 of the positioning screw connection 62 by changing the positions of the nuts 68, 69 relative to the support 80. If the bracket 72 needs to be repositioned in the direction of the axis 150 away from the support 80, the nut 69 of the positioning screw connection 62 needs to be loosened and rotated upwardly. The bracket 72 will be repositioned by turning the nut 68 away from the support 80 along the rod 66. Movement of the bracket 72 causes the spherical washer 87 to move relative to the seat element 89 while simultaneously moving the concave seat surface 92 relative to the convex seat 91. This will cause the shaft 50 to turn around its virtual pivot point 100 and allow a repositioning of the shaft 50 and thus the roller 20, until the surface of the roller 20 is correctly aligned relative to the surfaces of the other elements of the belt drive system 1.

Once the surface of the idler roller 20 is correctly aligned, the nut 69 needs to be fastened against the side of the bracket 72 so that no unwanted movement of the bracket 72 is possible.

Similar steps need to be carried out when altering the misalignment of the surface of the idler roller 20 in the direction of the axis 160 of the positioning screw connection 64. Once the surface of the idler roller 20 is correctly aligned, the nut 69 needs to be fastened against the side of the bracket 72 so that no unwanted movement of the bracket 72 is possible. Of course it is also possible to reposition the surface of the idler roller 20 by altering the position of the bracket 72 in the direction 150 of the positioning screw connection 62, followed by a change in the direction 160 of the positioning screw connection 64.

The idler roller assembly 30 needs translational adjustment in the direction 170 when the grooves 26 of the idler roller 20 are misaligned relative to the grooves of the engine pulley 12, cutter pulley 14 and blower pulley 16. This misalignment is corrected by loosening the four screw connections 107 connecting the further support 105 to the chassis 10.

If the idler roller assembly 30 needs to be moved towards chassis member 10', the nut 117 will need to be loosened. The idler roller assembly 30 will be moved towards the chassis member 10' by turning the nut 118 toward the chassis member 10' and sliding the slots 109 over the four screw connections 107.

If on the other hand the idler roller assembly 30 needs to be moved away from chassis 10', the nut 118 will need to be loosened. The idler roller assembly 30 will be moved away from the chassis 10' by turning the nut 117 away from the chassis 10' and sliding of the four screw connections 107 in the slots 109.

Once the grooves 26 of the idler roller assembly 30 are correctly aligned with the grooves of the pulleys 12, 14 and 16, the idler roller assembly 30 is secured again by turning the nut 117 against the side of the further support 105 and fastening the four screw connections 107.

The idler roller assembly 30 can thus be moved along axis 170 of the further positioning means 115 to correct the misalignment of the grooves of the idler roller 20 relative to the grooves of the engine pulley 12, cutter pulley 14 and blower pulley 16.

It is preferred to position the positioning screw connections 62, 64 such that the angle between the two positioning screw connections 62, 64 is 90° as shown in FIG. 2. Moreover, because of the limited available space between the belt 18 and the idler roller assembly 30, the positioning screw connection 62 is rotated preferably 45° backward from the top of the idler roller assembly 30, while the positioning screw connection 64 is located preferably 45° frontward from the top of the idler roller assembly 30. This allows sufficient space for applying tools on the nuts 68 and 69 to align the surface of the idler roller assembly 30 with the surfaces of the other elements of the belt drive system 1.

However, if more space is available between the belt 18 and the idler roller assembly 30, one may consider having a different positioning of the positioning screw connections 62, 64. The positioning screw connection 64 may be positioned in the X direction, while the positioning screw connection 62 is shifted 90° clockwise. In this case, the misalignment of the surface of the roller 20 along the X direction can be corrected by adjusting the position of the nuts 68, 69 along the threaded rod 66 of the positioning screw connection 64. The misalignment of the surface of the roller 20 along the Y direction can then be corrected by adjusting the position of the nuts 68, 69 along the threaded rod 66 of the positioning screw connection 62.

Likewise, it is possible to have an angle other than the angle of 90° between the positioning screw connections 62, 64 as in the described preferred embodiment. However, if another angle is chosen, one of the positioning screw connections will need to be altered to a greater extend than the other to correct the misalignment of the surface of the roller 20 depending on the location of the positioning screw connections 62, 64 relative to the idler roller shaft 50.

The inner elements of tensioning roller assembly 31 are analogous to the inner elements of the idler roller assembly 30. The difference lies in the indirect mounting of the further support 105' to the chassis 10. The further support 105' of the tensioning roller unit 31 is provided with a mounting extension 120 which allows the tensioning rod 23 of the tensioning system 24 to be connected to the tensioning roller assembly 31. The further support 105' is also connected to the bearing housing of the blower pulley 16 by a flange 122 so that a simultaneous movement of the blower with the tensioning roller assembly 31 and the tensioning roller system 24 is achieved when the blower is moved in or out the crop flow path of the forage harvester.

INDUSTRIAL APPLICABILITY

Although the invention has been described with reference to the drive of a forage harvester, it is obvious to the person skilled in the art that it also readily may be implemented in other agricultural machinery such as combine harvesters, mowers, corn pickers, etc.

The invention claimed is:

1. A roller assembly for a belt drive system of an agricultural machine, the roller assembly comprising:
   a shaft;
   a roller rotatably mounted on the shaft; and
   adjustment means for adjusting the position of the shaft, wherein the adjustment means further comprises means for angular adjustment of the position of the shaft in two distinct directions, wherein the angular adjustment of the shaft is about a point adjacent a first side of the roller, wherein the adjustment means further comprises positioning means adjacent a second side of the roller, wherein the positioning means further comprises a bracket affixed to the shaft and at least one screw connection extending through the bracket for varying the position of the adjacent side of the shaft in a first of the two distinct directions, wherein the positioning means further comprises at least one further screw connection extending through the bracket for varying the position of the adjacent side of the shaft in a second of the two distinct directions, wherein at least one of the screw connections is inserted in a support adjacent the second side of the roller, the support being provided with means for at least one of direct and indirect connection to the chassis of the agricultural machine, wherein the roller assembly further comprises clamping means for clamping at least one end of the shaft in a fixed position relative to the support after adjusting the position of the shaft, wherein the clamping means further comprises a bolt extending at least one of through and into the shaft, the bolt extending at least one of through and into the support.

2. The roller assembly according to claim 1, wherein the connecting means further comprises at least one further screw connection and a set pin for defining the position of the support.

3. The roller assembly according to claim 1, wherein the clamping means further comprises a first element between the support and the adjacent end of the shaft, the first element having a convex surface.

4. The roller assembly according to claim 3, wherein the first element is a spherical washer.

5. The roller assembly according to claim 3, wherein the clamping means further comprises a second element between the first element and the adjacent end of the shaft, the second element having a concave surface seated against the convex surface of the first element.

6. The roller assembly according to claim 1, wherein the adjustment means further comprises a convex seat arrangement against which one end of the shaft is adjustably held.

7. The roller assembly according to claim 6, wherein the seat arrangement further comprises a stationary convex seat provided on a further support and a concave seat surface on the shaft.

8. The roller assembly according to claim 6, wherein the seat arrangement further comprises a stationary concave seat provided on a further support and a convex seat surface on the shaft.

9. The roller assembly according to claim 7, wherein at least one of the seat and seat surface has a toroidal shape.

10. The roller assembly according to claim 6, wherein a cavity is provided in at least one of in and adjacent the seat arrangement registering with a cavity in the shaft, for supplying a lubricant to the roller.

11. The roller assembly according to claim 7, wherein a connection means is operable to connect the support to the further support.

12. The roller assembly according to claim 11, wherein the adjustment means further comprises further positioning means for translational adjustment of the position of the roller in a direction substantially parallel to the shaft.

13. The roller assembly according to claim 12, wherein the further positioning means further comprises at least one screw connection.

* * * * *